US012478305B2

(12) United States Patent
Young et al.

(10) Patent No.: US 12,478,305 B2
(45) Date of Patent: Nov. 25, 2025

(54) BIOMETRICS-ENABLED DENTAL OPERATORY

(71) Applicant: DentalEZ, Inc., Malvern, PA (US)

(72) Inventors: Robert Young, Bethlehem, PA (US); Heather Trombley, Chester Springs, PA (US); Travis Albano, Pensacola, FL (US); Daniel Martin, Spanish Fort, AL (US)

(73) Assignee: DENTALEZ, INC., Malvern, PA (US)

( * ) Notice: Subject to any disclaimer, the term of this patent is extended or adjusted under 35 U.S.C. 154(b) by 691 days.

(21) Appl. No.: 17/324,403

(22) Filed: May 19, 2021

(65) Prior Publication Data

US 2021/0361209 A1 Nov. 25, 2021

Related U.S. Application Data

(60) Provisional application No. 63/027,039, filed on May 19, 2020.

(51) Int. Cl.
*A61B 5/16* (2006.01)
*A61B 5/00* (2006.01)
(Continued)

(52) U.S. Cl.
CPC .......... *A61B 5/165* (2013.01); *A61B 5/02405* (2013.01); *A61B 5/0816* (2013.01);
(Continued)

(58) Field of Classification Search
None
See application file for complete search history.

(56) References Cited

U.S. PATENT DOCUMENTS 10,034,631 B1 * 7/2018 Gallagher ................ A61B 5/18
11,922,787 B1 * 3/2024 Barcia .................... G06V 10/70
(Continued)

FOREIGN PATENT DOCUMENTS

CN 107595260 A * 1/2018
CN 107595289 A * 1/2018
(Continued)

OTHER PUBLICATIONS

Sleep Tracking Sensor, Piezo Sensor Technology Safeguards Your Higher Quality Sleep, 1 page, 2009.
(Continued)

*Primary Examiner* — David R Dunn
*Assistant Examiner* — Christopher E Veraa
(74) *Attorney, Agent, or Firm* — Panitch Schwarze Belisario & Nadel LLP

(57) ABSTRACT

A system for monitoring anxiety of an individual includes a chair having at least a seat and a back, a base supporting the chair, and a first sensor disposed in at least one of the seat or the back. The first sensor is configured to, without being in direct contact with the individual, continuously obtain data related to a first physical characteristic from the individual seated in the chair. The first physical characteristic is one of respiration or pulse rate. The system further includes a display and a controller. The controller is configured to receive, in real-time, the data related to the first physical characteristic from the first sensor and compile a first metric from the received data. The first metric is configured to visually represent a change in the first physical characteristic. The controller is further configured to output the first metric to the display in real-time.

23 Claims, 7 Drawing Sheets

(51) Int. Cl.
  *A61B 5/024* (2006.01)
  *A61B 5/05* (2021.01)
  *A61B 5/08* (2006.01)
  *A61B 90/00* (2016.01)
  *A61C 1/08* (2006.01)
  *A61G 15/14* (2006.01)

(52) U.S. Cl.
  CPC .......... *A61B 5/6891* (2013.01); *A61B 5/7221* (2013.01); *A61B 5/742* (2013.01); *A61C 1/088* (2013.01); *A61G 15/14* (2013.01); *A61B 5/0059* (2013.01); *A61B 5/05* (2013.01); *A61B 2090/064* (2016.02); *A61B 2562/0261* (2013.01)

(56) References Cited

U.S. PATENT DOCUMENTS

| | | | |
|---|---|---|---|
| 2005/0124864 A1 | 6/2005 | Mack et al. | |
| 2007/0157385 A1* | 7/2007 | Lemire | A61G 7/0524 5/618 |
| 2008/0122269 A1 | 5/2008 | Tatlock | |
| 2010/0094096 A1 | 4/2010 | Petruzzelli et al. | |
| 2011/0102177 A1* | 5/2011 | Johnson | A61B 5/01 73/865.1 |
| 2011/0125046 A1 | 5/2011 | Burton et al. | |
| 2012/0289788 A1* | 11/2012 | Jain | A61B 5/165 702/19 |
| 2013/0225950 A1* | 8/2013 | Van Elswijk | G16H 10/20 600/309 |
| 2016/0270656 A1* | 9/2016 | Samec | A61B 8/10 |
| 2016/0367419 A1* | 12/2016 | Bhai | A61G 7/05738 |
| 2018/0157920 A1* | 6/2018 | Hu | G01S 7/4802 |
| 2019/0240535 A1* | 8/2019 | Santra | A61B 5/05 |
| 2019/0269369 A1 | 9/2019 | Horseman | |
| 2020/0085370 A1 | 3/2020 | Hill et al. | |
| 2020/0103244 A1* | 4/2020 | Cella | G06N 3/045 |
| 2021/0057101 A1* | 2/2021 | deSa | G08B 7/06 |
| 2021/0138293 A1* | 5/2021 | Bustamante | A63B 71/0619 |
| 2021/0153753 A1* | 5/2021 | Naude | A61B 5/14542 |
| 2022/0027643 A1* | 1/2022 | Ono | G06V 20/58 |
| 2022/0086988 A1* | 3/2022 | Coleman | F21V 14/02 |
| 2022/0114301 A1* | 4/2022 | Natarajan | G05D 1/0221 |
| 2022/0212675 A1* | 7/2022 | Fulbright | A61B 5/01 |
| 2022/0277557 A1* | 9/2022 | Wei | G06V 10/82 |
| 2022/0281117 A1* | 9/2022 | Eskandari | A61B 5/0022 |
| 2022/0364905 A1* | 11/2022 | Young | A61B 5/7203 |
| 2022/0371605 A1* | 11/2022 | Moton, Jr. | B60N 2/797 |
| 2023/0055654 A1* | 2/2023 | Amir | G01S 7/412 |
| 2024/0264303 A1* | 8/2024 | Hustava | G01S 15/523 |

FOREIGN PATENT DOCUMENTS

| | | | | |
|---|---|---|---|---|
| CN | 110691451 A | * | 1/2020 | |
| CN | 210743124 U | * | 6/2020 | |
| CN | 114587347 A | * | 6/2022 | |
| CN | 115633948 A | * | 1/2023 | |
| CN | 218450228 U | * | 2/2023 | |
| CN | 117085260 A | * | 11/2023 | |
| EP | 3081157 A1 | | 10/2016 | |
| JP | H02-166493 A | | 6/1990 | |
| JP | 03275058 A | * | 12/1991 | |
| JP | 2002-209965 A | | 7/2002 | |
| JP | 2003310584 A | * | 11/2003 | ............ A61B 5/16 |
| JP | 2005241445 A | * | 9/2005 | |
| JP | 2005342127 A | | 12/2005 | |
| JP | 2008-532587 A | | 8/2008 | |
| JP | 2009139243 A | * | 6/2009 | ....... B60R 21/01516 |
| JP | 2009-247649 A | | 10/2009 | |
| JP | 2015-066337 A | | 4/2015 | |
| JP | 2016-202347 A | | 12/2016 | |
| JP | 2019-057301 A | | 4/2019 | |
| KR | 102648395 B1 | * | 3/2024 | |
| WO | 2006090371 A2 | | 8/2006 | |
| WO | 2011052619 A1 | | 5/2011 | |
| WO | 2013/006618 A2 | | 1/2013 | |

OTHER PUBLICATIONS

Sleep Monitor Strip 10184000-01, Application Note, TE Connectivity, 11 pages, 2019.
International Search Report and Written Opinion issued Aug. 31, 2021 in International Application No. PCT/US21/33071.
International Preliminary Report on Patentability issued Dec. 1, 2022 in International Application No. PCT/US2021/033071.
Office Action issued Nov. 13, 2023 in JP Application No. 2022-570691 with English Translation.
Office Action issued Oct. 21, 2024 in JP Application No. 2024-059404 (with English Translation).

* cited by examiner

BIOMETRICS-ENABLED DENTAL OPERATORY

CROSS-REFERENCE TO RELATED APPLICATIONS

This application claims priority to U.S. Provisional Patent Application No. 63/027,039, filed May 19, 2020 and entitled, "Biometrics-Enabled Dental Operatory," currently, the entire contents of which are incorporated by reference herein.

BACKGROUND

Embodiments described herein relate generally to a dental operatory, and more particularly, to a dental operatory enabled for reading and reporting biometric data from a patient.

A major issue facing the dental industry is patient anxiety. Many patients are anxious about visiting the dentist, which can cause them to skip regularly scheduled appointments. For a patient, a problem that could have been found and corrected early on with a simple, routine procedure now requires extensive and expensive repair. Patient anxiety can also extend visit time or lead to abandoned care. The results are significantly increased costs, pain and suffering, and time for the patient, and a loss of productivity for the dentist.

However, it can be difficult for the dentist and staff to recognize patient anxiety during a procedure. The dental team is usually focused on a tiny working space within the patient's oral cavity. Unless the patient speaks up (which is difficult when the dentist is working within the mouth) or reacts in severe ways, the dentist is unlikely to be aware of a patient's growing anxiety. Moreover, once the patient's anxiety reaches such a stage, the procedure is likely to be slowed or prematurely aborted. It is also possible that the guesswork and late detection could lead to unnecessary higher risk through potentially unwarranted and costly intervention, e.g., through more and higher doses of anesthesia.

It is desired to provide technology capable of real-time, active (and preferably non-obtrusive) monitoring of a conscious patient for detecting and reporting a patient's anxiety level during a dental procedure, which would allow the dentist to perform appropriate intervention while allowing care to continue. Moreover, as understanding the connection between oral health and overall health has been rising, such recorded data may also provide a long-term view of the patient's overall health, which can be shared with primary care physicians, or the like.

BRIEF SUMMARY

Briefly stated, one embodiment comprises a system for monitoring anxiety of an individual. The system includes a chair having at least a seat and a back, a base supporting the chair, and a first sensor disposed in at least one of the seat or the back of the chair. The first sensor is configured to, without being in direct contact with the individual, continuously obtain data related to a first physical characteristic from the individual seated in the chair. The first physical characteristic is one of respiration rate or pulse rate. The system further includes a display and a controller operatively connected to the first sensor and the display. The controller is configured to receive, in real-time, the data related to the first physical characteristic from the first sensor and compile a first metric from the received data related to the first physical characteristic. The first metric is configured to visually represent a change in the first physical characteristic. The controller is further configured to output the first metric to the display in real-time.

In one aspect, the system further includes a second sensor disposed in at least one of the seat or the back of the chair. The second sensor is configured to, without being in direct contact with the individual, continuously obtain data related to a second physical characteristic from the individual seated in the chair. The second physical characteristic is one of respiration rate or pulse rate. The second physical characteristic is different from the first physical characteristic. The controller is operatively connected to the second sensor and is further configured to receive, in real-time, the data related to the second physical characteristic from the second sensor.

In another aspect, the controller is further configured to compile a second metric from the received data related to the second physical characteristic. The second metric is configured to visually represent a change in the second physical characteristic. The controller is further configured to output the second metric to the display in real-time.

In another aspect, the first sensor is disposed in the seat of the chair and the first physical characteristic is pulse rate. The second sensor is disposed in the back of the chair and the second physical characteristic is respiration rate.

In another aspect, the system further includes a second sensor disposed in at least one of the back of the chair or the base. The second sensor is configured to, without being in direct contact with the individual, continuously obtain data related to a second physical characteristic from the individual seated in the chair. The second physical characteristic is one of weight or body mass. The controller is operatively connected to the second sensor and further configured to receive, in real-time, the data related to the second physical characteristic from the second sensor, and to output to the display, in real-time, a current value of the second physical characteristic.

In another aspect, the second sensor is at least one of a strain gauge load cell or a force transducer.

In another aspect, the first sensor is a piezoelectric film strip.

In another aspect, the seat or back of the chair in which the first sensor is disposed is formed by a pad at least partially surrounded by a cover. The first sensor is disposed between the pad and the cover.

In another aspect, the system includes a plurality of the first sensors, and the controller is configured to compile the first metric based on a combination of the received data related to the first physical characteristic from each of the plurality of the first sensors.

In another aspect, the first metric is a plot of the first physical characteristic with respect to time.

In another aspect, the first physical characteristic is pulse rate, and the controller is further configured to output, in addition to the first metric, a current value of the pulse rate to the display.

In another aspect, the first physical characteristic is respiration rate, and the controller is further configured to output, in addition to the first metric, a current value of the respiration rate to the display.

In another aspect, the controller is further configured to: calculate, from the data related to the first physical characteristic, a standard deviation, and output to the display, in real-time, a value representing an anticipated accuracy level of the first metric based on the calculated standard deviation.

In another aspect, the controller is disposed within the base.

In another aspect, the chair has at least one configuration wherein the seat and the back of the chair form a non-zero angle with respect to one another.

Another embodiment comprises a method for monitoring anxiety of an individual seated in a chair. The chair has at least a seat and a back. The method includes continuously obtaining, by a first sensor disposed in at least one of the seat or the back of the chair, and without being in direct contact with the individual, data related to a first physical characteristic from the individual seated in the chair. The first physical characteristic is one of respiration rate or pulse rate. The method further includes receiving in real-time, by a controller operatively connected to the first sensor, the data related to the first physical characteristic from the first sensor and compiling, by the controller, a first metric from the received data related to the first physical characteristic. The first metric is configured to visually represent a change in the first physical characteristic. The method further includes outputting, by the controller, the first metric to a display in real-time.

In one aspect, the method further includes continuously obtaining, by a second sensor disposed in at least one of the seat or the back of the chair, and without being in direct contact with the individual, data related to a second physical characteristic from the individual seated in the chair. The second physical characteristic is one of respiration rate or pulse rate and is different from the first physical characteristic. The method further includes receiving in real-time, by the controller, which is operatively connected to the second sensor, the data related to the second physical characteristic from the second sensor.

In another aspect, the method further includes compiling, by the controller, a second metric from the received data related to the second physical characteristic. The second metric is configured to visually represent a change in the second physical characteristic. The method further includes outputting, by the controller, the second metric to the display in real-time.

In another aspect, the first sensor is disposed in the seat of the chair and the first physical characteristic is pulse rate, and the second sensor is disposed in the back of the chair and the second physical characteristic is respiration rate.

In another aspect, the first metric is a plot of the first physical characteristic with respect to time.

Yet another embodiment comprises a dental operatory equipped for monitoring anxiety of a patient. The operatory includes a dental chair having at least a seat and a back, a base supporting the chair, a dental light equipped with a light head configured to emit light toward an oral cavity of the patient seated in the dental chair, and a first sensor disposed in the seat or the back of the dental chair or disposed in the light head of the dental light. The first sensor is configured to, without being in direct contact with the patient, continuously obtain data related to a first physical characteristic from the patient seated in the dental chair. The first physical characteristic is one of respiration rate or pulse rate. The system further includes a display and a controller operatively connected to the first sensor and the display. The controller is configured to receive, in real-time, the data related to the first physical characteristic from the first sensor and compile a first metric from the received data related to the first physical characteristic. The first metric is configured to visually represent a change in the first physical characteristic. The controller is further configured to output the first metric to the display in real-time.

In one aspect, the first physical characteristic is respiration rate, and the first sensor is disposed in the light head of the dental light. The first sensor is a radar or lidar sensor.

In another aspect, the first sensor is a piezoelectric film strip and is disposed between a pad and a cover forming the back or seat of the dental chair in which the first sensor is disposed.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Figure 1:
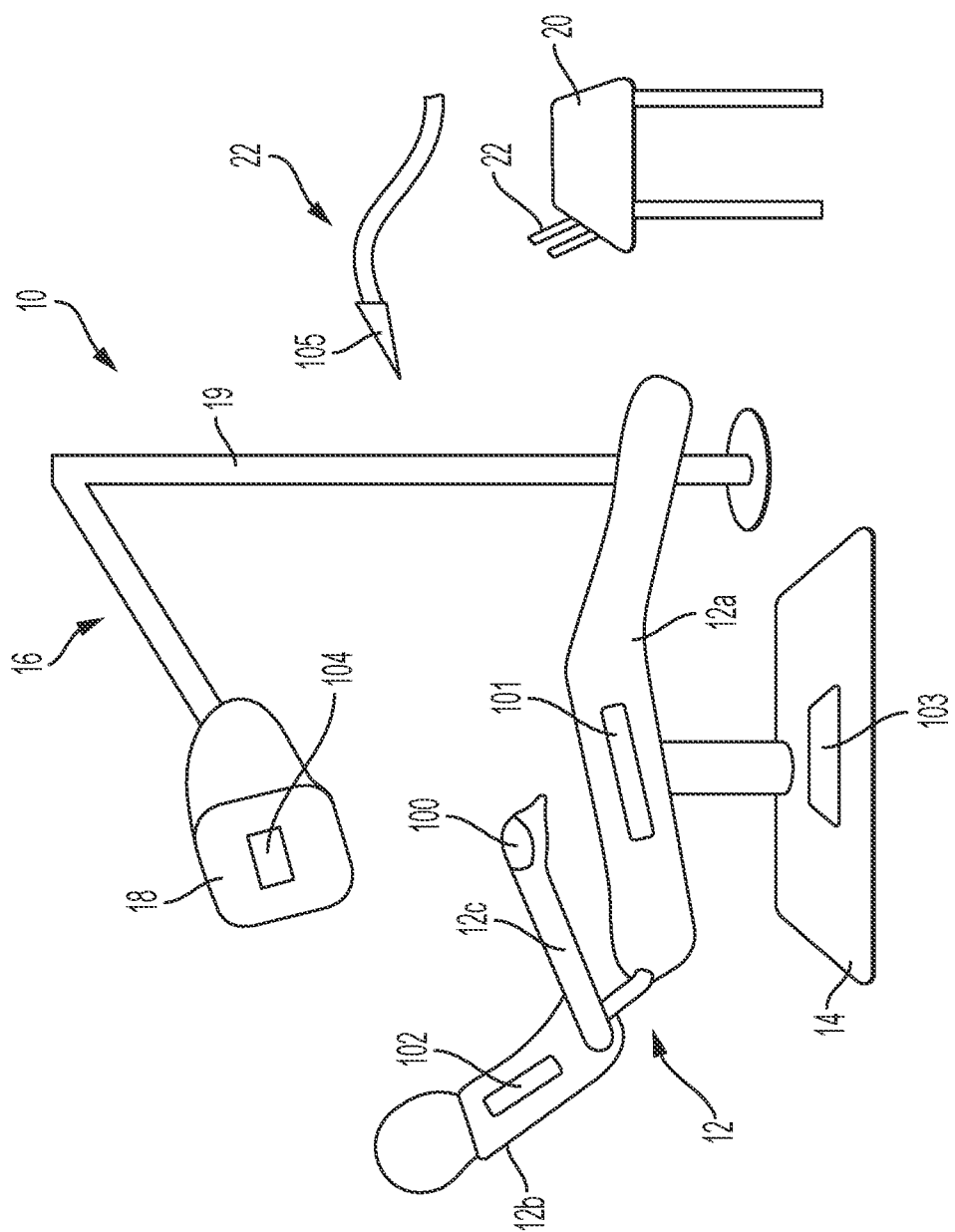
FIG. 1 is a schematic diagram of an example of a dental operatory in accordance with the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIG. 1, there is schematically shown part of a dental operatory 10 in accordance with possible embodiments of the invention. As is conventionally known, the operatory 10 may include a patient chair 12, which may be supported by a base 14, for seating a patient during a dental procedure. The operatory 10 may further include a dental light 16 equipped with a light head 18 that emits light toward the patient's oral cavity during the dental procedure. The operatory 10 may further include an instrument tray 20 containing a plurality of instruments 22, one or more of which may be used during a dental procedure. The operatory 10 can further include other conventional components not shown in FIG. 1, such as a dentist's stool, a compressor, a vacuum, an irrigation unit, an X-ray machine, or the like.

Various embodiments of the dental operatory 10 preferably include one or more sensors or other like types of detection devices for monitoring one or more physical or behavioral aspects of the patient before and/or during a dental procedure. For example, one or more sensors 100, 101, 102 may be connected to, disposed on, or embedded in various portions of the dental chair 12, such as the seat 12a, back and/or headrest 12b, armrest 12c, or the like. The chair 12 may be adjustable for changing the configuration of, for example, the seat 12a with respect to the back/headrest 12b. In the example shown in FIG. 1, the chair 12 has at least one configuration wherein the seat 12a and the back/headrest 12b of the chair 12 form a non-zero angle with respect to one another.

Examples of sensors 101, 102 that may be associated with or distributed among the seat 12a and back/headrest 12b include, but are not limited to, a temperature sensor (e.g., a thermistor, IC temperature sensor, thermocouple, or the like), a resistance or impedance sensor, a pressure sensor, an accelerometer, and the like. Examples of sensors 100 that may be utilized with the armrest 12c include, but are not limited to, a temperature sensor (e.g., a thermistor, IC temperature sensor, thermocouple, or the like), a resistance or impedance sensor or other type of electrical sensor (voltage, current, or the like), a pressure sensor, a glucose sensor (e.g., a finger prick-type blood sensor or a sensor that communicates with a subcutaneously implanted continuous glucose monitoring chip), an optical sensor (with or without corresponding light source), an accelerometer, or the like. The dental chair 12 may include a single sensor, multiple types of sensors, a plurality of the same sensor type, or combinations thereof. Moreover, one sensor may have multiple components distributed among various portions 12a, 12b, 12c of the dental chair 12.

The base 14 of the dental chair 12 may also or alternatively include one or more sensors 103 connected thereto, disposed thereon, or embedded therein. Examples of sensors 103 that may be used with the base 14 include a pressure sensor or other type of weighing scale, an accelerometer, or the like. The base 14 may include a single sensor, multiple types of sensors, a plurality of the same sensor type, or combinations thereof.

The dental light 16 may also or alternatively include one or more sensors 104 connected thereto, disposed thereon, or embedded therein, preferably within the light head 18. Examples of sensors 104 that may be used with the dental light 16 include, but are not limited to, a camera or other photodetector sensitive to particular wavelengths of light, including but not limited to ultraviolet, infrared, visible light, combinations thereof, or the like, a radar sensor, a lidar sensor, or the like. The dental light 16 may include a single sensor, multiple types of sensors, a plurality of the same sensor type, or combinations thereof.

One or more instruments 22 may also or alternatively include one or more sensors 105 connected thereto, disposed thereon, or embedded therein. For example, an instrument 22 may include a lancet or the like as a sensor 105 for obtaining a blood sample from the patient during a procedure within the oral cavity. The sensor 105 could also be an optical sensor, a temperature sensor, a resistance or impedance sensor, or the like. An instrument 22 may include a single sensor, multiple types of sensors, a plurality of the same sensor type, or combinations thereof. Moreover, different types of instruments may include different sensor types. Still further, one sensor may have multiple components distributed among an instrument 22 and other components of the operatory 10, such as the dental chair 12. For example, the instrument 22 may form one electrode of a sensor while the dental chair 12 incorporates a second electrode for measuring impedance, or the like.

The sensors 100, 101, 102, 103, 104, 105 may be used alone or in conjunction with others to obtain data on patient physical and behavioral characteristics that can be used by the dentist to evaluate a patient's anxiety and/or report concerns of various conditions to the patient's primary care physician or other medical provider, where appropriate. The following are non-limiting examples of patient data that can be acquired by the various sensors 100, 101, 102, 103, 104, 105.

Blood pressure—may be measured with a sensor 100 in the form of an optical sensor and accompanying LED light source in the armrest 12c. For example, the patient's finger may rest on top of the sensor 100 in the armrest 12c. In another embodiment, the sensor 100 may be utilized in a clip (not shown) that attaches to the patient's finger. Such a sensor 100 may be coupled to related circuitry (not shown) in the armrest 12c either wirelessly or by a cable, or to other components in the dental operatory 10. Significant changes to the patient's blood pressure before or during a dental procedure may indicate a heightened anxiety level.

Core body temperature—may be measured with one or more sensors 101, 102 in the form of a temperature sensor (e.g., a thermistor or the like) in the seat 12a or back/headrest 12b of the dental chair 12. Additionally or alternatively, core body temperature may be measured using a sensor 104 in the form of an infrared camera mounted within the dental light 16. Additionally or alternatively, core body temperature may be measured using a sensor 105 in the form of a temperature sensor (e.g., a thermistor or the like) included as or with a dental instrument 22. Significant changes to the patient's core body temperature before or during a dental procedure may indicate a heightened anxiety level.

Extremity (e.g., a hand) temperature—may be measured with one or more sensors 100 in the form of a temperature sensor (e.g., a thermistor or the like) in the armrest 12c. For example, the patient's hand may rest on top of the sensor 100 in the armrest 12c. In another embodiment, the sensor 100 may be utilized in a clip (not shown) that attaches to the patient's finger or other portions of the hand. Such a sensor 100 may be coupled to related circuitry (not shown) in the armrest 12c either wirelessly or by a cable, or to other components in the dental operatory 10. Additionally or alternatively, the extremity temperature may be measured using a sensor 104 in the form of an infrared camera mounted within the dental light 16. Significant changes to the patient's extremity temperature before or during a dental procedure may indicate a heightened anxiety level.

Galvanic skin conductance—may be measured with one or more sensors 100, 101, 102 in the form of a resistance or impedance sensor in the dental chair 12. Such sensor 100, 101, 102 may require direct skin contact with the patient, such that the patient may have a hand, leg, neck, or the like resting on top of the appropriate sensor 100, 101, 102. Alternatively, one or more sensors 100, 101, 102 may be in the form of a patch (not shown) that attaches to the patient's skin. Such a sensor 100, 101, 102 may be coupled to related circuitry (not shown) in the dental chair 12 either wirelessly or by a cable, or to other components in the dental operatory 10. In another embodiment, a sensor 105 in the form of a resistance or impedance sensor may be included as or with a dental instrument 22. Increases in a patient's galvanic skin response before or during a dental procedure may indicate a heightened anxiety level.

Glucose level—may be measured with one or more sensors 100 in the form of a finger prick-type glucose sensor in the armrest 12c. The patient would be required to press their finger to the sensor 100 in order to obtain a blood sample for glucose level testing. Alternatively, if the patient has an implanted continuous glucose monitoring chip (not shown) in their arm (such as near the wrist), the sensor 100 may be in the form of a module capable of wirelessly communicating with the implanted chip for obtaining the measured glucose data. Significant changes to the patient's extremity temperature before or during a dental procedure may indicate a heightened anxiety level.

Grip pressure—may be measured with one or more sensors 100 in the form of a pressure sensor in the armrest 12c. Before or during a dental procedure, an anxious patient may tend to grip or squeeze the armrest 12c. The sensor 100 would therefore be located in an optimal location of the armrest 12c to detect the amount of pressure being applied by the patient during such gripping or squeezing.

Peripheral oxygen saturation ($SpO_2$)—may be measured with a sensor 100 in the form of an optical sensor and accompanying LED light source in the armrest 12c similar to the blood pressure detection described above. Significant changes to the patient's peripheral oxygen saturation before or during a dental procedure may indicate a heightened anxiety level.

Perspiration—may be measured using sensors 100, 101, 102 in the form of resistance or impedance sensors in the dental chair 12 similar to the galvanic skin conductance detection described above. Skin resistance and impedance can vary depending on the state of sweat glands in the patient's skin, and sweating before or during a dental procedure may indicate a heightened anxiety level.

Figure 2:
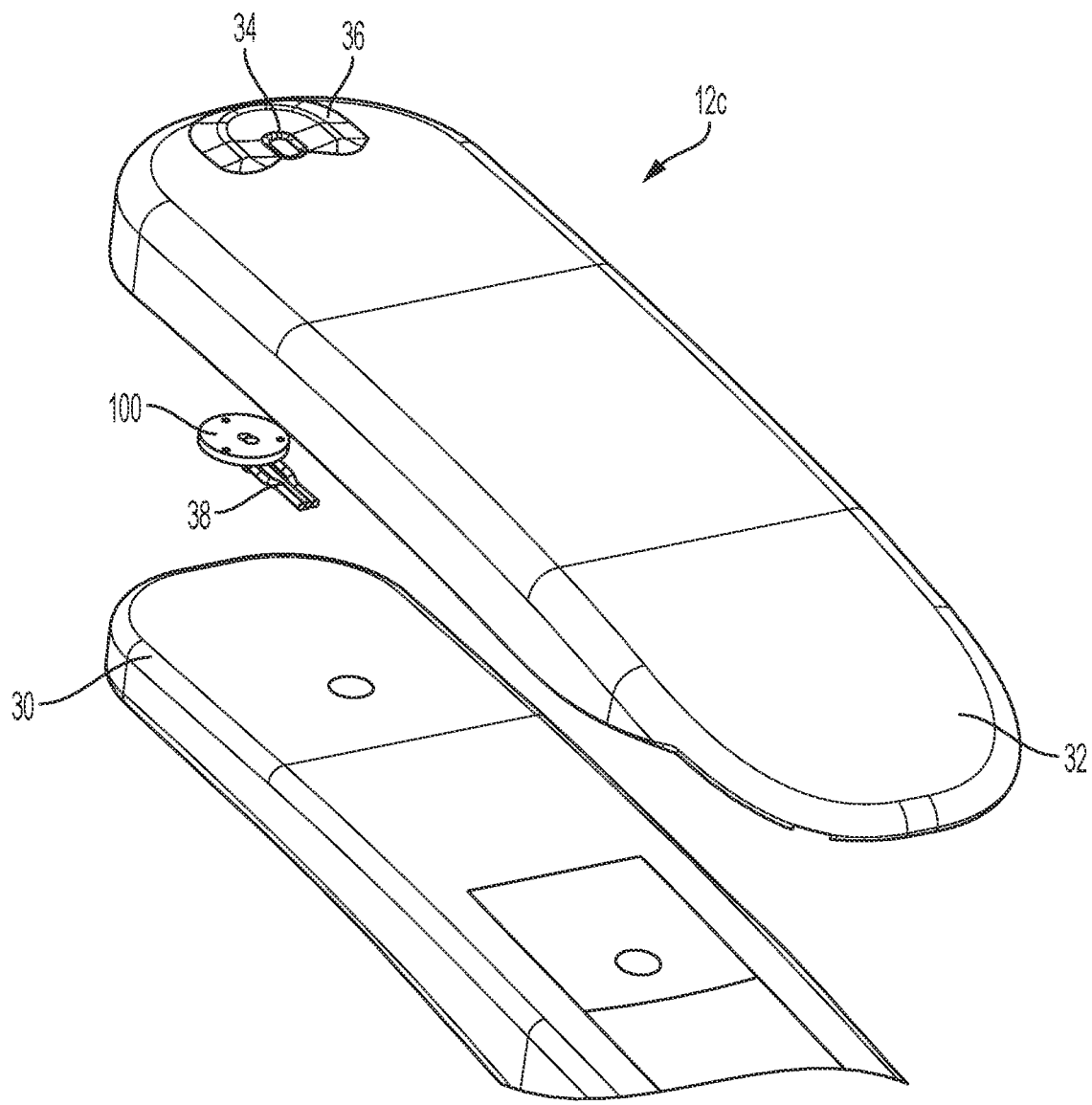
FIG. 2 is a partial top perspective exploded view of a dental chair armrest incorporating a sensor according to one embodiment of the present invention.

Pulse rate—may be measured with a sensor 100 in the form of an optical sensor and accompanying LED light source in the armrest 12c. In the example of FIG. 2, the pulse sensor 100 is model PulseSensor_864620000204, which is commercially available from PulseSensor.com. To utilize the pulse sensor 100, the patient's finger may, for example, rest on top of the sensor 100 in the armrest 12c. An example is shown in FIG. 2 where the pulse sensor 100 is disposed between a plastic core 30 of the armrest 12c and an elastomeric cover 32 that partially surrounds the core 30. The cover 32 includes an opening 34 located toward its distal end that is aligned with the position of the sensor 100. Light from the sensor 100 is able to pass through the opening 34 and be reflected back by a patient's finger covering the opening 34. A raised ridge 36 is further provided on the cover 32 partially surrounding the opening 34, thereby helping to guide the patient's finger to the opening 34. Data collected by the sensor 100 may be transmitted by a cable 38 for evaluation and display, as will be described in further detail below. In another embodiment, the sensor 100 may be utilized in a clip (not shown) that attaches to the patient's finger. Such a sensor 100 may be coupled to related circuitry (not shown) in the armrest 12c either wirelessly or by a cable, or to other components in the dental operatory 10. An increase in the patient's pulse rate before or during a dental procedure may indicate a heightened anxiety level.

Pupil dilation—may be measured by a sensor 104 in the form of a visible light camera mounted in the dental light 16. For example, such a camera could be positioned to monitor the patient's eye during a dental procedure and software running on the camera or in a connected controller (see e.g., FIG. 5) can analyze sequential images to detect size changes of the pupil. Dilation of the patient's pupils before or during a dental procedure may indicate a heightened anxiety level.

Figure 3:
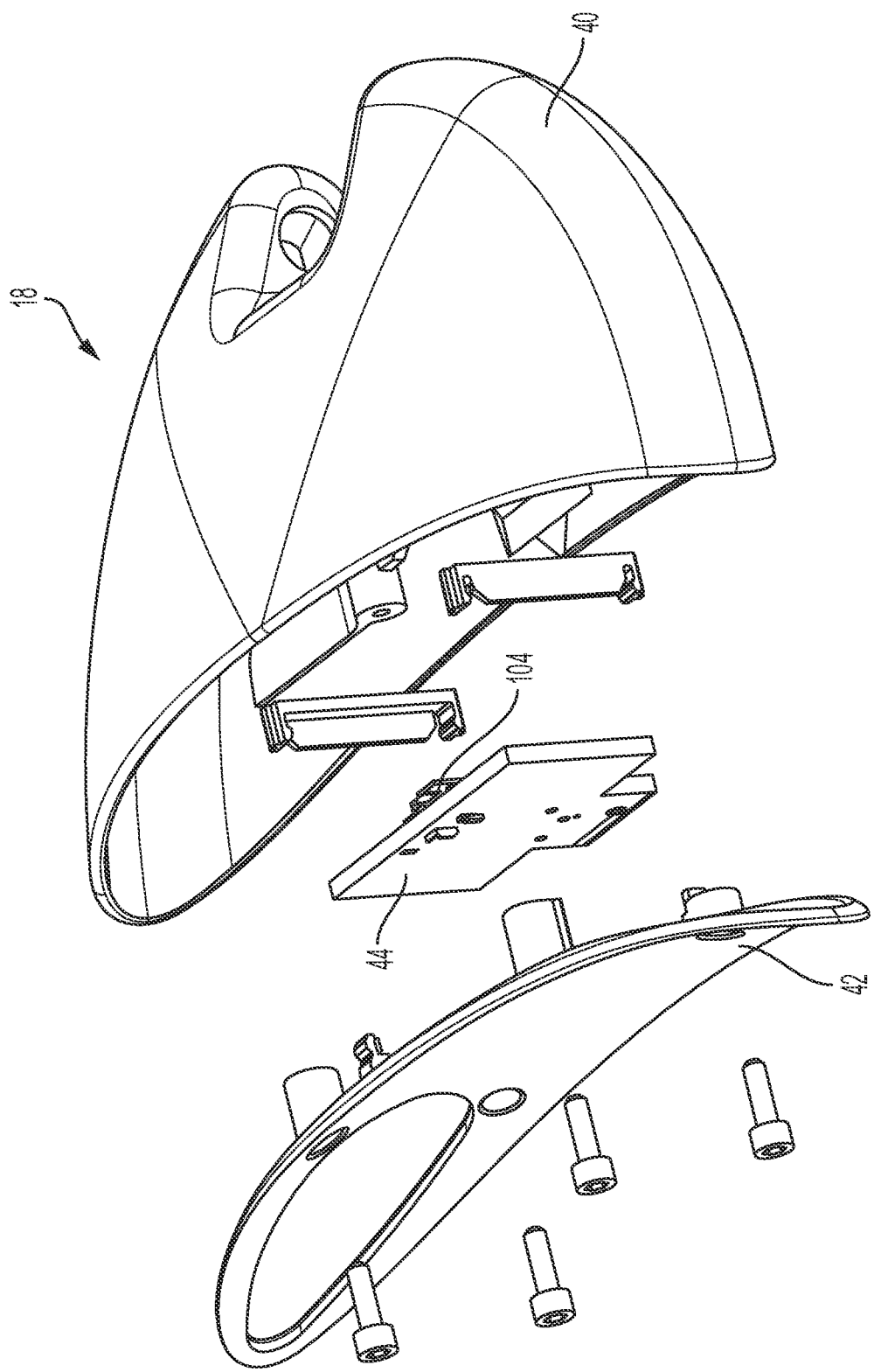
FIG. 3 is a top perspective exploded view of a dental light head incorporating a sensor according to one embodiment of the present invention.
Figure 4A:
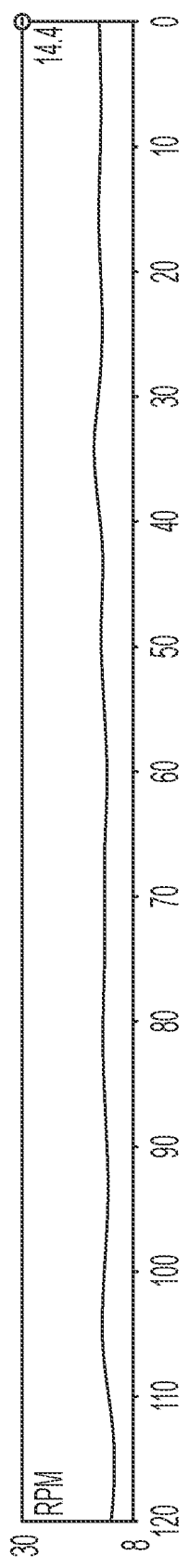
FIGS. 4A and 4B are example data outputs from the sensor in FIG. 3.
Figure 4B:
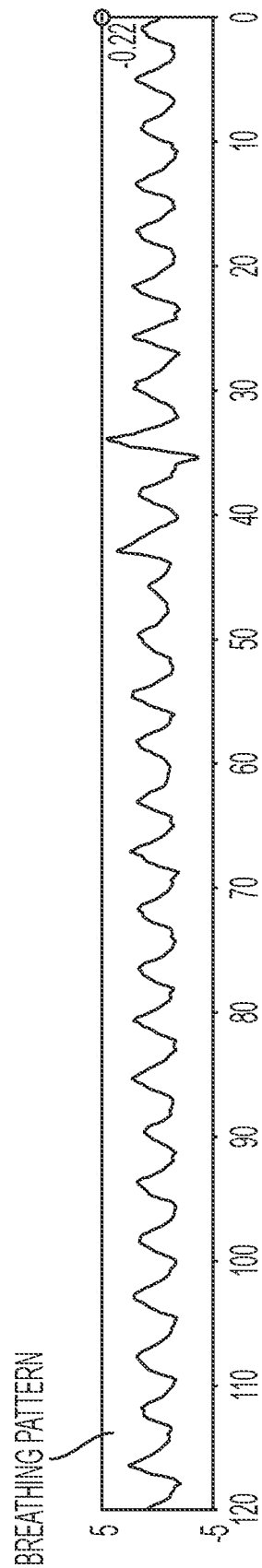

Respiration rate—may be measured by a sensor 104 in the form of a radar or lidar sensor mounted in the dental light 16. For example, the light head 18 may be positioned so as to allow the radar or lidar to detect motion of the patient's chest representative of the patient's respiration rate. An example is shown in FIG. 3 where a radar sensor 104 is disposed within a housing 40 of the light head 18. The radar sensor 104 would be at least partially obscured from view behind the light exit plate 42 that closes the housing 40. The radar sensor 104 may be mounted to a circuit board 44 that can be affixed to the housing 40 and/or light exit plate 42, and which may include further circuitry for data capture and analysis. For example, in the embodiment shown in FIG. 3, the radar sensor 104 is part of the X4M200 Respiration Data Sensor available from Novelda AS of Oslo, Norway. In this example, the radar sensor 104 may be powered by the power supply (not shown) of the dental light 16, which itself receives electrical power from the dental operatory 10 (e.g., via an electrical outlet or the like). Examples of data that may be acquired by the radar sensor 104 are shown in FIGS. 4A and 4B. FIG. 4A shows a plot of respirations per minute over time and FIG. 4B shows a breathing pattern detected via the rising and falling of the patient's chest. The data from the radar sensor 104 may be communicated wirelessly or via a cable (not shown) from the sensor 104 itself or from the circuit board 44 for evaluation and display, as will be described in further detail below. Additionally or alternatively, respiration rate could be measured by one or more sensors 101, 102 in the form of accelerometers in the seat 12a and/or back/headrest 12b of the dental chair 12. The accelerometers could be used to detect repetitive motion of the patient in the chair representative of a respiration rate. An increase in the patient's pulse rate before or during a dental procedure may indicate a heightened anxiety level.

Trembling—may be measured by a sensor 104 in the form of a radar or lidar sensor mounted in the dental light 16 or by sensors 101, 102 in the form of accelerometers in the seat 12a and/or back/headrest 12b of the dental chair 12 similar to the respiration rate described above. Excessive movement would be noted by the sensor(s) 101, 102, 104, which before or during a dental procedure may indicate a heightened anxiety level.

Sedation level—may be measured by one or more of the sensors observing various behaviors of the patient tending to reflect characteristics of sedation (or conversely, agitation). For example, various behaviors may be monitored for comparison with accepted sedation scales, such as the Riker Sedation-Agitation Scale, the Richmond Agitation-Sedation Scale, or the like. Such behaviors could include, for example, movement (detected by a sensor 104 in the dental light 16, such as a radar/lidar sensor, camera, or the like, or by sensors 101, 102 in the form of accelerometers in the seat 12a and/or back/headrest 12b), pulse rate (detected as described above with a pulse sensor 100 in the armrest 12c), respiration rate (detected as described above with a radar/lidar sensor 104 in the dental light 16 or by accelerometers in the seat 12a and/or back/headrest 12b), oxygen levels (detected as described above with a sensor 100 in the armrest 12c), or the like. Various detected behaviors could be analyzed and combined by a controller 50 (FIG. 5) to ascertain and report sedation level.

Weight or body mass—may be measured by a sensor 103 in the form of a pressure sensor, strain gauge load cell, force transducer, or other weighing scale located in the base 14 of the dental chair 12. Such a sensor 103 can also be located directly in the chair 12, including in the seat 12a or back/headrest 12b.

A1C level—may be measured by a sensor 105 in the form of a lancet included as or with a dental instrument 22. During a dental procedure, for example probing, the dentist may use the lancet 105 to acquire a blood sample from the patient for A1C level testing.

Endentulism—may be measured by a sensor 104 mounted in the dental light 16 in the form of a camera or other photodetector sensitive to particular wavelengths of light, including but not limited to ultraviolet, infrared, visible light, combinations thereof, or the like. The sensor 104 would be used to detect the presence or absence of one or more teeth in the patient and could be as simple as a visible light camera. In another example embodiment, the sensor 104 may be equipped for detecting biofluorescence of tissue in the patient's mouth following excitation by a light source (not shown) that could also be mounted in the dental light 16 or be a handheld device, or the like. In a still further example embodiment, the sensor 104 may be in the form of an infrared camera used as part of a photothermal radiometry system, wherein tissue in the patient's mouth may be stimulated by a laser or other light source (not shown) in the dental light 16 or elsewhere, and the resulting heat conversion would be detected by the sensor 104.

Body composition metrics (e.g., body mass index (BMI), body fat percentage, water composition, skeletal muscle mass percentage)—may be measured using the weight described above in combination with data from other sensors, such as one or more sensors 100, 101, 102 in the form of a resistance or impedance or other electrical sensor in the dental chair 12. For example, bioelectrical impedance analysis (BIA) can be used to estimate body composition via passing a weak electric current through the body and measuring the voltage to calculate the body's impedance. Appropriate touch points (not shown) for sourcing the current to the patient, such as electric plates, may be provided on the dental chair 12, such as in the armrest 12c or the like.

Figure 5:
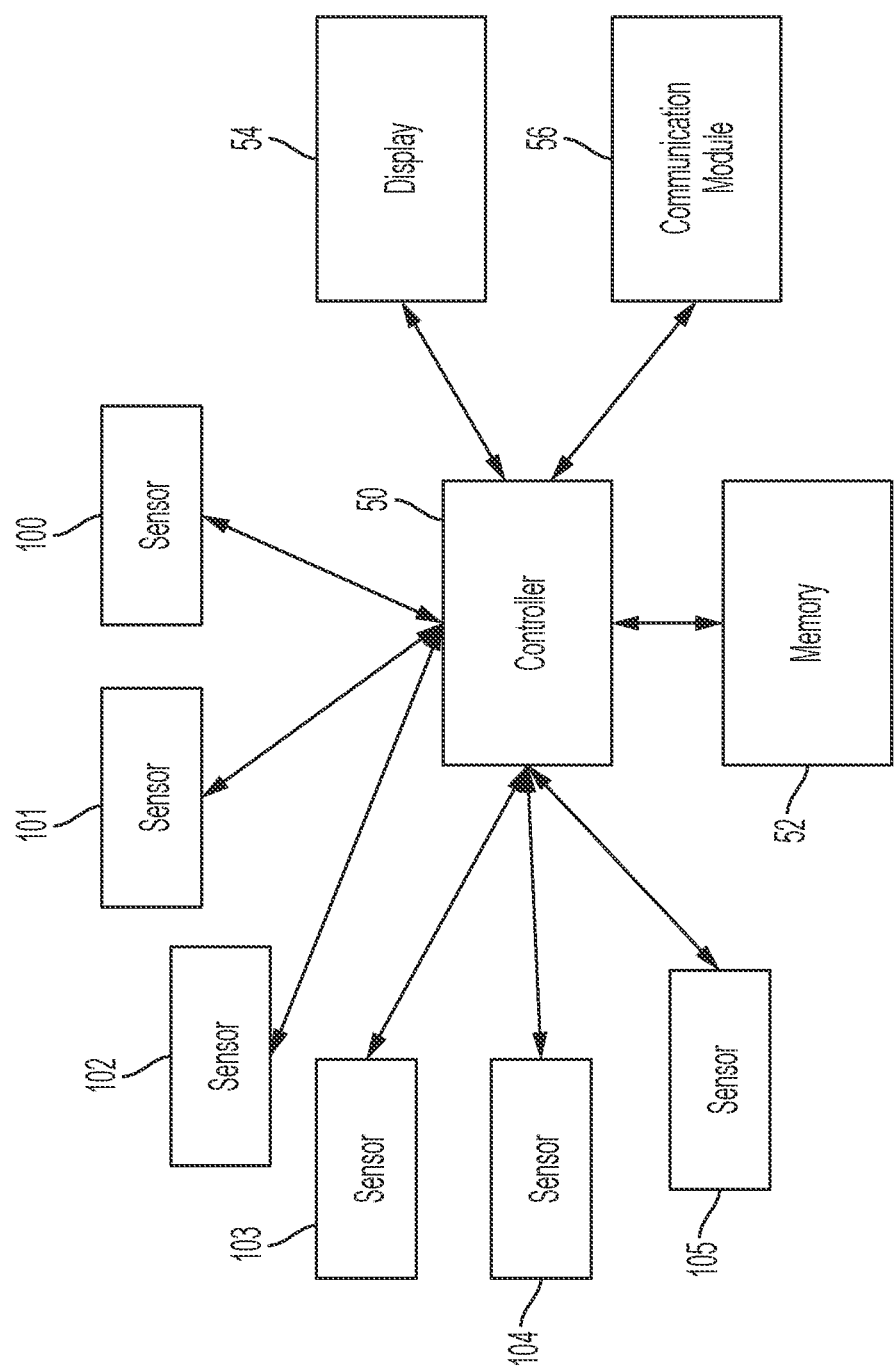
FIG. 5 is a schematic block diagram of an example control system in accordance with the present invention.

Referring now to FIG. 5, the one or more sensors 100-105 deployed within the dental operatory 10 may communicate with a controller 50 that is configured to collect and analyze data received from the sensor(s) 100-105. Such communications may occur over cabled connections. Simple sensors having basic signal out pins may connect directly with the controller 50 via a dedicated input. More sophisticated sensors integrated with or coupled to their own dedicated processing circuit board (e.g., circuit board 44 in FIG. 3) may send data to the controller using conventional wired protocols, for example by USB, FireWire, or the like. In another alternative, communication may take place over a local area network (LAN) or the like, or via the Internet. Similarly, communication may be wireless, such as through direct data exchange (e.g., via Bluetooth or the like) or over a wireless network or the Internet (e.g., via Wi-Fi, cellular network, or the like). The controller 50 may be located within the dental operatory 10 (for example, the controller 50 may be housed within the base 14 of the chair 12) or nearby, such as in a utility room or the like, but may also be remotely located.

The controller 50 may also provide power to one or more sensors 100-105, such as by dedicated power cables or through the communication lines (e.g., USB or the like). Alternatively, a sensor 100-105 may have its own dedicated power supply separate from the controller 50. In yet another embodiment, a sensor 100-105 may derive power from the component of the dental operatory 10 with which it is associated. For example, the optical sensor 100 in the armrest 12c of FIG. 2 may couple to a power supply of the dental chair 12. Similarly, a sensor 104 in the dental light 16 may obtain power from the associated lamp power supply, and the like.

Where possible, it is preferred that the dental operatory 10 components include options for or be designed to allow enclosed passage of any communication and/or power cables from the sensors 100-105 to reduce clutter and potential tripping hazards. For example, the cable 38 from the optical sensor 100 in FIG. 2 may run under the cover 32 and ultimately through an opening (not shown) in the core 30 that allows the cable 38 to pass into the seat 12a of the dental chair 12 and ultimately into the base 14. The cable 38 could emerge from the base 14 for connection to the controller 50 or other receptacles. Similarly, a USB cable (not shown) connected to the circuit board 44 of the radar sensor 104 in the light head 18 in FIG. 3 may extend from the housing 40 into a stand 19 (FIG. 1) or other support of the light head 18 to avoid dangling wires.

A memory 52 may be connected to or integrated with the controller 50 for storing data received from any sensor(s) 100-105, as well as potentially storing other information, such as results from analysis performed on the received data by the controller 50, instructions for controller 50 operation, patient data, notes from the dentist, or the like. The memory 52 may be, for example, a flash memory, random access memory (RAM), hard disk, solid state drive, or the like, or combinations thereof. In some embodiments, at least a portion of the memory 52 may be located remotely from the controller 50, such as in one or more remote servers, or the like.

The controller 50 may be further connected to a display 54 that is configured to display sensor data and/or the results of analyses performed on the sensor data by the controller 50. The connection may be via a wired or wireless connection or may take place over a network or via the Internet. Alternatively, the display 54 may be integrated with the controller 50 in a common housing (not shown). The display 54 is preferably in a location for easy viewing by the dentist during a dental procedure so the dentist can evaluate in real-time whether anxiety-relieving measures are appropriate for the patient. At the same time, it may be preferable to place the display 54 where it cannot be viewed by the patient, so as to prevent further anxiety. For example, a dedicated display 54 may be mounted in the dental operatory 10 (on a wall, for example) or may be integrated into one of the dental operatory components 10, such as the dental chair 12, the dental light 16, the instrument tray 20, or the like. The display 54 could alternatively be portable. In other embodiments, the display 54 need not be dedicated and may be provided by a separate general computing or mobile device, such as a desktop monitor, a tablet, mobile phone, laptop, or the like. In such examples, the computer or mobile device may have an app that allows communication with the controller 50 for receipt and display of the relevant data.

Alternatively, the computer or mobile device may include the controller 50 and includes software for receiving and analyzing the sensor data.

The controller 50 may also include or be connected with a communication module 56. The communication module 56 may serve to facilitate the above-described communication with the sensor(s) 100-105, but may also be utilized to communicate received sensor data, analysis, patient data, dentist notes, or the like externally, such as to a primary care physician or other medical provider, a pharmacy, or the like. The communication module may be a wired or wireless connection to a private network or to the Internet, and so could be an Ethernet port, Wi-Fi network card, cellular network card, or the like. The controller 50 can include multiple communication modules 56 as needed for operation, or to provide options to the dentist for receipt/transmission.

As described above, the controller 50 may use the display 54 to present direct sensor data to the dentist, such as the respirations per minute or the breathing pattern of the patient shown in FIGS. 4A and 4B. Where multiple patient characteristics are available, either from a single sensor or from multiple sensors, the display 54 may be configured to present all of the data simultaneously. Alternatively, the display 54 may cycle through each automatically at a predetermined speed, or the dentist may be permitted to toggle the data for display as desired.

The controller 50 may further analyze the data from one or more sensors 100-105 in order to, for example, present a more understandable output to the dentist, to compile data into a single metric, to make treatment recommendations, or the like, or combinations thereof. For example, the controller 50 may analyze received sensor data by comparison with corresponding baseline data. For example, a received pulse rate from the optical sensor 100 in FIG. 2 can be compared with a baseline pulse rate to determine if the received pulse rate is higher with respect to the baseline. The baseline data can be predetermined and stored in memory 52 from research related to appropriate levels for patients, and can vary depending on, for example, age, weight, height, sex, or the like, or combinations thereof. In one example, research may show that for a patient of certain characteristics, an average resting pulse rate should be about 80 beats per minute. Thus, the controller 50 may determine whether and by how much the patient's detected pulse rate exceeds this pre-established threshold. The dentist may be able to select the appropriate parameters for comparison via an interface (not shown), such as a keyboard, mouse, touchscreen, or the like, or combinations thereof.

Alternatively, the baseline may be established through capturing and storing sensor data of the patient prior to a dental procedure, or from previous sessions. For example, before the procedure begins (presumably before the patient experiences any anxiety), the optical sensor 100 of FIG. 2 may detect that the patient has a pulse rate of 84 beats per minute. This may be stored in memory 52 and used by the controller 50 for comparison as the dental procedure is underway. In this manner, the baselines are more individualized to the patient, rather than being based on a general class of patients.

Baselines or other thresholds may also be incremental. For example, a resting pulse rate may be established as 84 beats per minute, while mild anxiety may be characterized by an elevated pulse rate of 105 beats per minute, with extreme anxiety being set at 120 beats per minute. Thus, the controller 50 would be able to establish varying levels of anxiety with multiple threshold evaluation points.

The controller 50 may also translate received sensor data into, for example, an anxiety score or result that provides the dentist with an easy to understand metric. Taking the example above of the various pulse rate levels, the controller 50 may cause the display 54 to output different alerts to the dentist based on the comparison with the received pulse rate data. For example, if the patient's pulse rate is between 84 and 105 beats per minute, the display 54 may output a green color, between 105 and 120 beats per minute, the display may output a yellow color, and above 120 beats per minute, the display may output a red color. The controller 50 may also or alternatively use numerical scales, verbal indications, images, or the like, or combinations thereof to communicate varying detected levels of patient anxiety. In addition or alternatively to a display 54, the controller 50 may have or be connected to an audible or tactile alert device (not shown), such as a speaker or the like.

To more accurately reflect the patient's anxiety level, it can be useful to use data from multiple different types of sensors 100-105. For example, a combination of pulse rate, respiration rate, and perspiration level may be measured by sensors 100, 102, 104 in the armrest 12c, back/headrest 12b, and dental light 16, respectively, to analyze the patient's anxiety. The controller 50 may be configured to analyze the collected data from the three sensors 100, 102, 104 (either individually against baselines and/or together against a combined baseline) to determine the appropriate alert to output via the display 54. The analysis may include relative weighting of the various sensor readings based on various factors, such as sensor accuracy, variation from baseline, representativeness of anxiety, or the like, or combinations thereof. For example, pulse rate data may be weighted more heavily in the above example if the optical sensor 100 in the armrest 12c is deemed to provide more accurate readings than the respiration sensor 104 or impedance sensor 102 and/or if the pulse rate data is deemed to be more representative of anxiety than respiration rate or perspiration. Similarly, impedance sensor 102 data may be weighted less heavily if the readings deviate less significantly from baseline than data from the other sensors 100, 104.

In addition or alternatively to outputting data representing the patient's current anxiety level, the controller 50 may be programmed to provide an appropriate recommendation to the dentist for alleviating the patient's anxiety. The recommendation may be based on the individual sensor data and/or any analysis by the controller 50 of anxiety level with reference to a prestored protocol table or other instructions saved in memory 52. For example, recommended courses of action can include changing the temperature of the dental chair 12, changing the room temperature, changing the height of the dental chair 12, pausing the procedure, talking to the patient, encouraging the patient to take deep breaths, changing music or other auditory or visual stimuli in the room, engaging in relaxation techniques such as visualization or the like, adjusting the flow of anesthetic such as nitrous oxide, combinations thereof, or the like. To the extent that the controller 50 may be connected to any instrumentation of the dental operatory 10, some relief measures may be applied automatically. For example, the controller 50 may have the ability to adjust the flow rate of nitrous oxide to the patient.

In some embodiments, the dental operatory 10 may be responsive to the anxiety findings of the controller 50 to help calm the patient. For example, the dental chair 12 may, in response to an alert by the controller 50, provide relief through temperature changes by heating or cooling elements (not shown) distributed throughout the dental chair 12, gentle movement by one or more motors (not shown) or similar devices in the dental chair 12 and/or the base 14, auditory cues via speakers (not shown) in the dental chair 12, or the like, or combinations thereof. Similarly, the controller 50 may be in communication with room lighting, audio, temperature control, or other like systems (not shown) in the dental operatory 10 which can be varied to ease the patient's anxiety. The controller 50 may continue to monitor the sensor feedback to determine that the employed measures are working to reduce the patient's anxiety and recommend or trigger additional measures as necessary.

While the system shown in FIG. 5 is shown having a single, centralized controller 50, the functionality of the controller 50 may be spread among multiple devices while still keeping with the spirit of the invention. For example, each individual sensor 100-105 may have its own dedicated controller performing some or all of the requisite analysis before reporting the results to a centralized location. In some embodiments, the sensor(s) may provide data or analysis directly to the display 54 or the like. In some embodiments, the central controller 50 may be associated or connected with an individual sensor, to which all other sensors in the system would report. The architecture for data gathering, analysis, and reporting can be varied according to the needs of the dentist and are not limited to the example embodiments shown and described herein.

Figure 6A:
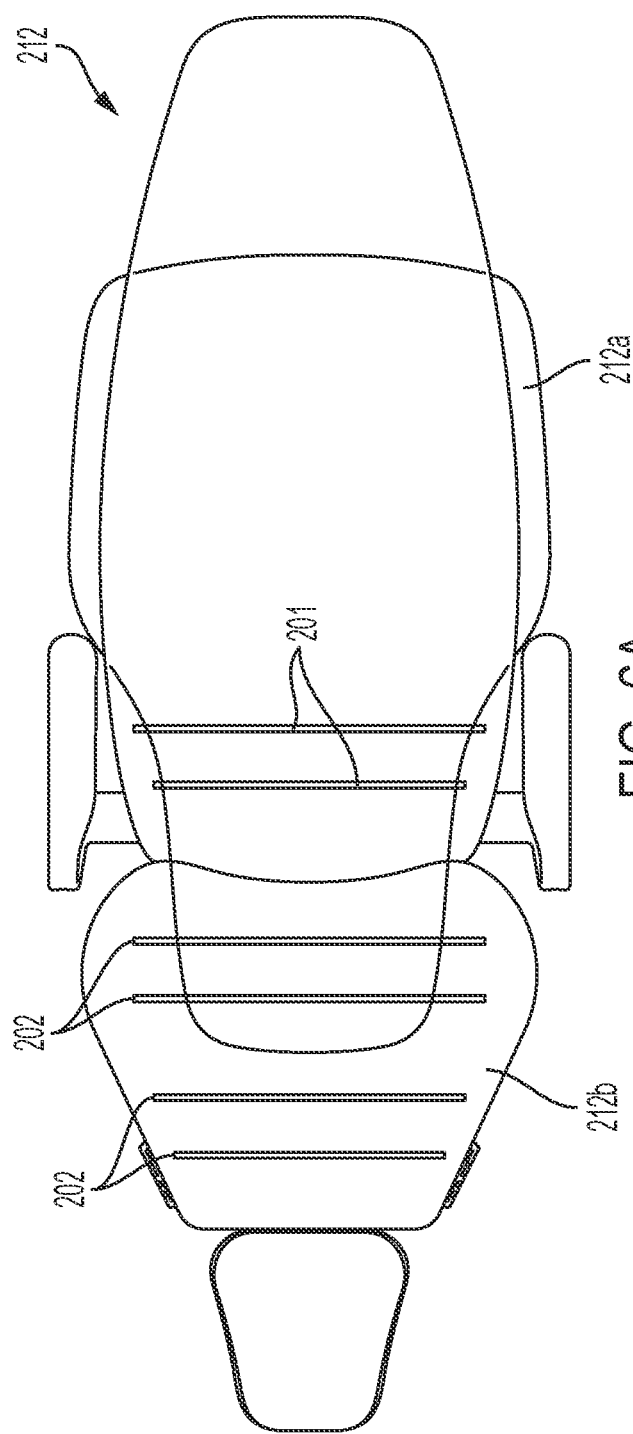
FIG. 6A is a schematic block diagram of an example of a chair incorporating sensors according to one embodiment of the present invention.

FIG. 6A is one example of a chair 212 for use in the system described herein. The chair 212 in FIG. 6A includes a seat 212a and a back 212b. A first sensor 201 is shown as being disposed in the seat 212a and a second sensor 202 is disposed in the back 212b. In this example, the first and second sensors 201, 202 are both piezoelectric film strips that produce a charge or voltage output under a dynamic strain, such as the "Sleep Monitor Strip," Part No. 10184000-01 available from TE CONNECTIVITY LTD. of Schaffhausen Switzerland. However, the first and second sensors 201, 202 may differ from one another, and may be one of the other types of sensors described herein, as necessary. For example, one of the sensors may be a strain gauge load cell or a force transducer configured for measuring weight or body mass. Each of the first and second sensors 201, 202 is configured to, without being in direct contact with the individual seated in the chair 212, continuously obtain data related to different respective physical characteristics. While first and second sensors 201, 202 are shown, more or fewer sensors may be deployed as needed.

For example, in FIG. 6A, the first sensor 201 is configured to obtain data related to the seated individual's pulse rate, and the second sensor 202 is configured to obtain data related to the individual's respiration rate. Using more than one of the first and/or second sensor 201, 202 allows for additional data collection and an improvement to the accuracy of the physical characteristic measurement(s). In the particular example shown in FIG. 6A, there are two first sensors 201 disposed in the seat 212a to detect data related to pulse rate and four second sensors 202 disposed in the back 212b to detect data related to respiration rate. However, more or fewer of each sensor 201, 202 can be used, as desired. Moreover, if multiple first sensors 201 are used, for example, the first sensors 201 do not all need to be confined to a single portion of the chair 212 such as the seat 212a. The first sensors 201 can be distributed between the seat 212a and the back 212b, as desired. The same is true for the second sensors 202 and any other configuration where multiples of the same sensor are deployed.

Figure 6B:
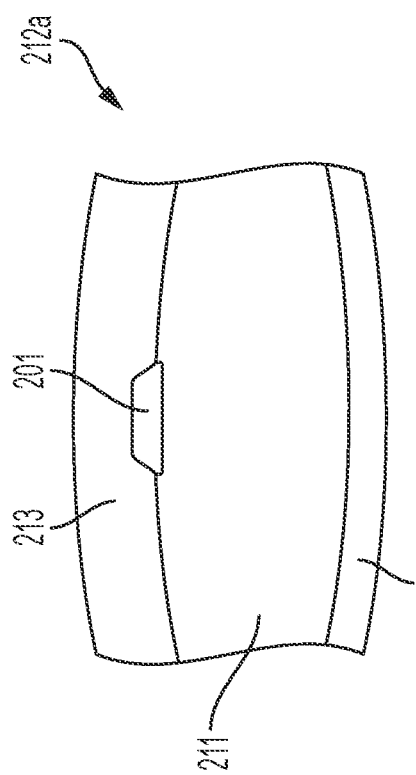
FIG. 6B is a cross-sectional side elevational view of a portion of the chair in FIG. 6A.

FIG. 6B shows an example of the first sensor 201 being disposed within the seat 212a in a manner such that the necessary data can be obtained from the individual seated in the chair 212 without being in direct contact with the individual. In this example, the seat 212a is formed by a pad 211 that is at least partially surrounded by a cover 213. The first sensor 201, in the form of a piezoelectric strip as described above, or as another sensor type, is disposed between the pad 211 and the cover 213. The cover 213 may removably receive the pad 211, similar to a pillow case and include a closure member (not shown). The cover 213 may also be attached to the pad 211 more permanently, such as by stitching, fasteners, friction fit, injection molding, or the like. Sensors disposed in the back 212b or other portions of the chair 212 may be configured in a similar manner. One of the goals of embodiments such as the one shown in FIGS. 6A and 6B is to acquire data of physical characteristics of the individual in a passive manner—that is, without the individual having to take affirmative actions (or preferably, without even being aware) in order for the data to be acquired.

Figure 7:
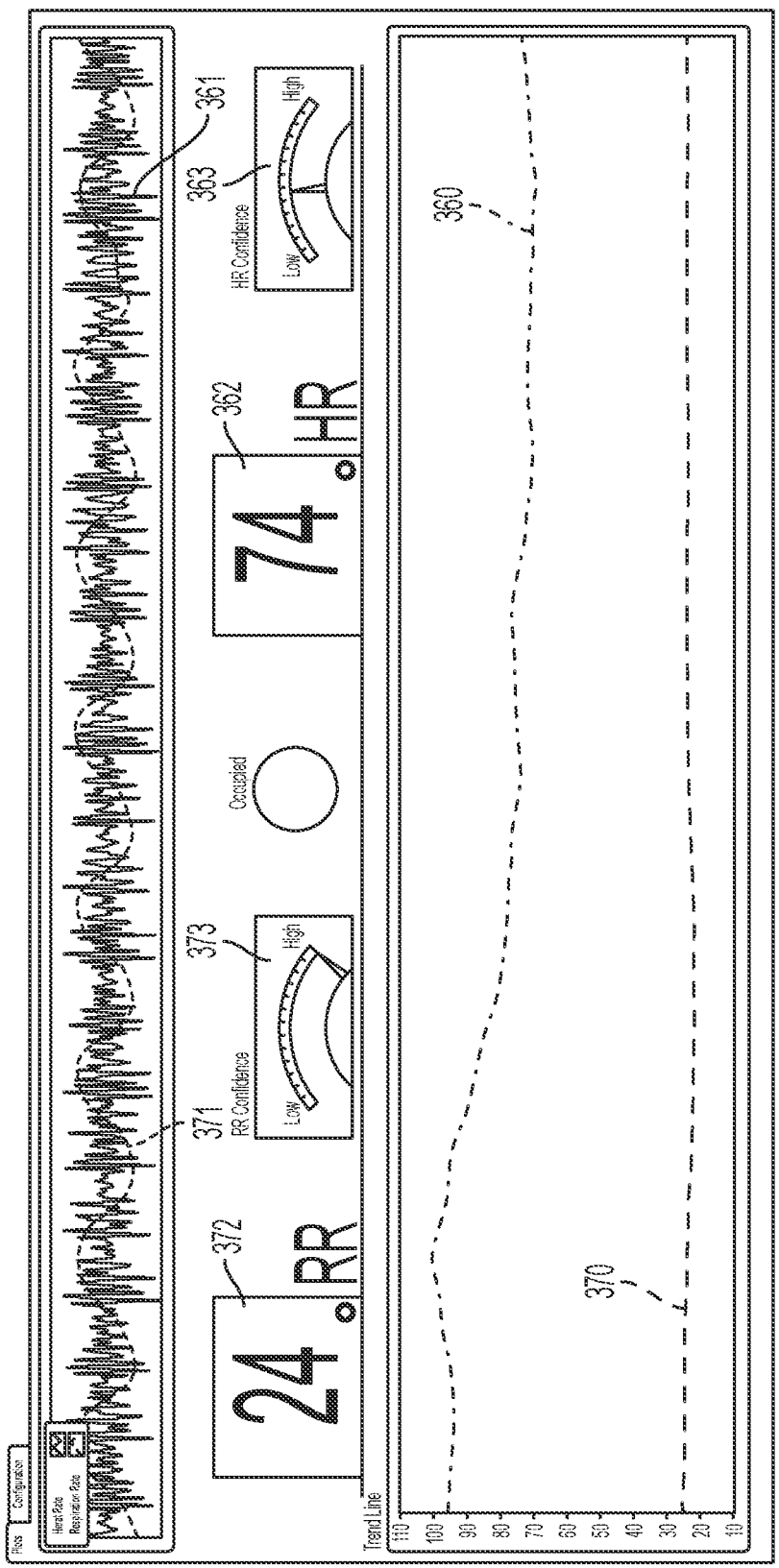
FIG. 7 is a screenshot of an example display output according to one embodiment of the present invention.

FIG. 7 is a screenshot of an example display output. Referring to the chair 212 from FIG. 6A, the first sensor 201 acquires and provides, in real-time, data related to a physical characteristic (e.g., pulse rate) to the controller 50 (FIG. 5). The controller 50 may compile a metric from the received data, such as a visual representation of a change in the physical characteristic, and then output that metric to the display in real-time. In FIG. 7, the controller 50 has compiled and output to the display a plot 360 of pulse rate over time. This trend line is easier for a practitioner focused on the oral cavity to quickly read and evaluate than, for example, observing or detecting changes in a recorded pulse graph 361 or continually monitoring a current pulse rate value 362. However, the controller 50 may output to the display one or all of such data. When a plurality of first sensors 201 are utilized, such as in FIG. 6A, the controller 50 may base the metric on a combination of the received data from all of the first sensors 201. In one example, the controller 50 may determine a pulse rate from each first sensor 201 and average the pulse rates to obtain the metric. In another example, the controller 50 may evaluate the data from each first sensor 201 and select the data that is the most accurate (e.g., the least amount of noise or the like).

The second sensor 202 similarly acquires and provides, in real-time, data related to another physical characteristic (e.g., respiration rate) to the controller 50. The controller 50 again may compile a metric from the received data similar to that for the first sensor 201 for output to the display in real-time. For example, in FIG. 7 the controller 50 has compiled and output to the display another plot 370 representing respiration rate over time. In addition to, or alternatively, the controller 50 may output to the display a recorded respiration graph 371 or a current respiration rate value 372. The controller 50 may provide as many of the metrics or other data from the sensors as desired. The practitioner may also have the option to choose which data is presented on the display.

In some embodiments, the controller 50 may also output to the display a value that represents an anticipated accuracy level of one or more of the metrics. For example, FIG. 7 shows a pulse rate "Confidence" level 363 and a respiration rate "Confidence" level 373, each of which are provided as a dial positioned on a scale between "Low" and "High." Other display interfaces may be used, such as alphanumeric values or phrases, colors, or the like. The anticipated accuracy level controller 50 can be, for example, an indicator of the quality of the signal received from the sensors 201, 202, accounting for noise level and the like. One method to determine the anticipated accuracy level value is to calculate a standard deviation from the data related to the physical characteristic. For example, the controller 50 may use a predetermined number of prior readings (e.g., 50, 100, or the like) to determine the standard deviation. As the standard deviation gets greater, the anticipated accuracy level will drop and vice versa.

While the example described above involves sensors disposed in the seat, one or more sensors may be disposed in the base, the dental light, and/or other areas of the dental operatory to provide the data related to physical characteristics, as desired.

Those skilled in the art will recognize that boundaries between any above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A system for monitoring anxiety of an individual, the system comprising:
    a chair having at least a seat and a back;
    a base supporting the chair;
    a sensor for measuring pulse rate arranged in an armrest of the chair, the pulse rate sensor including an optical sensor and accompanying light source housed within the armrest such that light from the light source is passed through an opening in the armrest for reflection by a finger of the individual covering the opening and detection by the optical sensor;
    a first sensor disposed in the back of the chair, the first sensor is a piezoelectric film strip and is configured to, without being in direct contact with the individual, continuously obtain data related to a first physical characteristic from the individual seated in the chair, the first physical characteristic being respiration rate;
    a display; and
    a controller operatively connected to the first sensor, the pulse rate sensor, and the display, the controller being configured to:
        receive, in real-time, the data related to the first physical characteristic from the first sensor,
        compile a first metric from the received data related to the first physical characteristic, the first metric being configured to visually represent a change in the first physical characteristic,
        output the first metric to the display in real-time,
        receive, in real-time, the pulse rate from the pulse rate sensor,
        compile a pulse rate metric from the received pulse rate, the pulse rate metric being configured to visually represent a change in the pulse rate,
        output the pulse rate metric to the display in real-time,
        calculate, from the data related to the first physical characteristic, a first standard deviation,
        calculate, from the data related to the pulse rate, a pulse rate deviation,
        determine an anxiety level of the individual based on the data related to the first physical characteristic and the pulse rate, the determination of the anxiety level including a relative weighting of the data related to the first physical characteristic and the pulse rate based at least on the calculated first standard deviation and the calculated pulse rate deviation,
        analyze the determined anxiety level with respect to a threshold level, and
        based on finding that the determined anxiety level exceeds the threshold level, (1) output an alert to the display indicating a heightened anxiety level of the individual and recommending one or more courses of action to reduce the heightened anxiety level of the individual, or (2) automatically initiate a remedial action performed using the chair to reduce the heightened anxiety level of the individual.

2. The system of claim 1, further comprising a second sensor disposed in the base, the second sensor being configured to, without being in direct contact with the individual, continuously obtain data related to a second physical characteristic from the individual seated in the chair, the second physical characteristic being one of weight or body mass, and
    wherein the controller is operatively connected to the second sensor and further configured to receive, in real-time, the data related to the second physical characteristic from the second sensor, and to output to the display, in real-time, a current value of the second physical characteristic.

3. The system of claim 2, wherein the second sensor is at least one of a strain gauge load cell or a force transducer.

4. The system of claim 1, comprising a plurality of the first sensors, and wherein the controller is configured to compile the first metric based on a combination of the received data related to the first physical characteristic from each of the plurality of the first sensors.

5. The system of claim 1, wherein the first metric is a plot of the first physical characteristic with respect to time.

6. The system of claim 1, wherein the controller is further configured to output, in addition to the first metric, a current value of the respiration rate to the display.

7. The system of claim 1, wherein the controller is further configured to:
    output to the display, in real-time, a value representing a first anticipated accuracy level for the first metric based on the calculated first standard deviation and a value representing a pulse rate accuracy level for the pulse rate metric based on the calculated pulse rate deviation.

8. The system of claim 1, wherein the pulse rate metric is a plot of the pulse rate with respect to time.

9. The system of claim 8, wherein the controller is further configured to output, in addition to the pulse rate metric, a current value of the pulse rate to the display.

10. The system of claim 1, wherein the remedial action performed using the chair includes at least one of changing a temperature of heating or cooling elements distributed through the chair or gently moving one or more motors in the chair.

11. A method for monitoring anxiety of an individual seated in a chair, the chair having at least a seat and a back, the method comprising:
continuously obtaining, by a pulse rate sensor arranged in an armrest of the chair, a pulse rate, the pulse rate sensor including an optical sensor and accompanying light source housed within the armrest such that the pulse rate is obtained by passing light from the light source through an opening in the armrest for reflection by a finger of the individual covering the opening and detecting the reflected light by the optical sensor;
continuously obtaining, by a first sensor in the form of a piezoelectric film strip and disposed in at least one of the seat or the back of the chair, and without being in direct contact with the individual, data related to a first physical characteristic from the individual seated in the chair, the first physical characteristic being respiration rate;
receiving in real-time, by a controller operatively connected to the first sensor, the data related to the first physical characteristic from the first sensor;
compiling, by the controller, a first metric from the received data related to the first physical characteristic, the first metric being configured to visually represent a change in the first physical characteristic;
outputting, by the controller, the first metric to a display in real-time;
receiving in real-time, by the controller operative connected to the pulse rate sensor, the pulse rate from the pulse rate sensor;
compiling, by the controller, a pulse rate metric from the received pulse rate, the pulse rate metric being configured to visually represent a change in the pulse rate;
outputting, by the controller, the pulse rate metric to the display in real-time;
calculating, by the controller from the data related to the first physical characteristic, a first standard deviation;
calculating, by the controller from the data related to the pulse rate, a pulse rate deviation;
determining, by the controller, an anxiety level of the individual based on the data related to the first physical characteristic and the pulse rate, the determination of the anxiety level including a relative weighting of the data related to the first physical characteristic and the pulse rate based at least on the calculated first standard deviation and the calculated pulse rate deviation,
analyzing, by the controller, the determined anxiety level with respect to a threshold level, and
based on finding that the determined anxiety level exceeds the threshold level, (1) outputting an alert to the display indicating a heightened anxiety level of the individual and recommending one or more courses of action to reduce the heightened anxiety level of the individual, or (2) automatically initiating a remedial action performed using the chair to reduce the heightened anxiety level of the individual.

12. The method of claim 11, wherein the first metric is a plot of the first physical characteristic with respect to time.

13. The method of claim 11, wherein the pulse rate metric is a plot of the pulse rate with respect to time.

14. The method of claim 13, further comprising outputting, by the controller, in addition to the pulse rate metric, a current value of the pulse rate to the display.

15. The method of claim 11, further comprising:
outputting to the display, by the controller in real-time, a value representing a first anticipated accuracy level for the first metric based on the calculated first standard deviation and a value representing a pulse rate accuracy level for the pulse rate metric based on the calculated pulse rate deviation.

16. The method of claim 11, wherein the remedial action performed using the chair includes at least one of changing a temperature of heating or cooling elements distributed through the chair or gently moving one or more motors in the chair.

17. A dental operatory equipped for monitoring anxiety of a patient, the operatory comprising:
a dental chair having at least a seat and a back;
a base supporting the chair;
a sensor for measuring pulse rate arranged in an armrest of the chair, the pulse rate sensor including an optical sensor and accompanying light source housed within the armrest such that light from the light source is passed through an opening in the armrest for reflection by a finger of the individual covering the opening and detection by the optical sensor;
a dental light equipped with a light head configured to emit light toward an oral cavity of the patient seated in the dental chair;
a first sensor in the form of a radar or lidar sensor and disposed in the light head of the dental light, the first sensor being configured to, without being in direct contact with the patient, continuously obtain data related to a first physical characteristic from the patient seated in the dental chair, the first physical characteristic being respiration rate;
a display; and
a controller operatively connected to the first sensor, the pulse rate sensor, and the display, the controller being configured to:
receive, in real-time, the data related to the first physical characteristic from the first sensor,
compile a first metric from the received data related to the first physical characteristic, the first metric being configured to visually represent a change in the first physical characteristic,
output the first metric to the display in real-time,
receive, in real-time, the pulse rate from the pulse rate sensor,
compile a pulse rate metric from the received pulse rate, the pulse rate metric being configured to visually represent a change in the pulse rate,
output the pulse rate metric to the display in real-time,
calculate, from the data related to the first physical characteristic, a first standard deviation,
calculate, from the data related to the pulse rate, a pulse rate deviation,
determine an anxiety level of the patient based on the data related to the first physical characteristic and the pulse rate, the determination of the anxiety level including a relative weighting of the data related to the first physical characteristic and the pulse rate based at least on the calculated first standard deviation and the calculated pulse rate deviation,
analyze the determined anxiety level with respect to a threshold level, and
based on finding that the determined anxiety level exceeds the threshold level, (1) output an alert to the display indicating a heightened anxiety level of the individual and recommending one or more courses of action to reduce the heightened anxiety level of the patient, or (2) automatically initiate a remedial action performed using the chair to reduce the heightened anxiety level of the patient.

18. The operatory of claim 17, wherein the pulse rate metric is a plot of the pulse rate with respect to time.

19. The operatory of claim 18, wherein the controller is further configured to output, in addition to the pulse rate metric, a current value of the pulse rate to the display.

20. The operatory of claim 17, wherein the first metric is a plot of the first physical characteristic with respect to time.

21. The operatory of claim 17, wherein the controller is further configured to output, in addition to the first metric, a current value of the respiration rate to the display.

22. The operatory of claim 17, wherein the controller is further configured to:
   output to the display, in real-time, a value representing a first anticipated accuracy level for the first metric or the pulse rate based on the calculated first standard deviation and a value representing a pulse rate accuracy level for the pulse rate metric based on the calculated pulse rate deviation.

23. The operatory of claim 17, wherein the remedial action performed using the chair includes at least one of changing a temperature of heating or cooling elements distributed through the chair or gently moving one or more motors in the chair.

\* \* \* \* \*